Aug. 27, 1957 R. MÄSTLING ET AL 2,804,508

TAPE REPRODUCER

Filed July 26, 1955 4 Sheets-Sheet 1

Aug. 27, 1957 R. MÄSTLING ET AL 2,804,508
TAPE REPRODUCER
Filed July 26, 1955 4 Sheets-Sheet 2
Fig.5
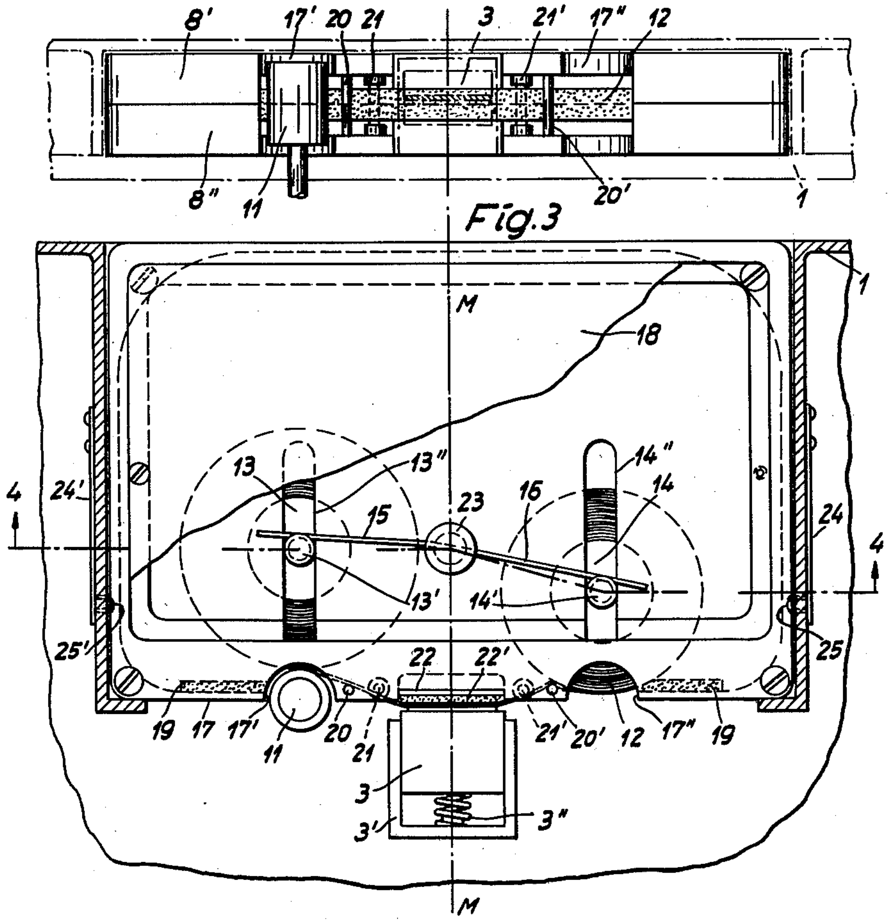
Fig.3
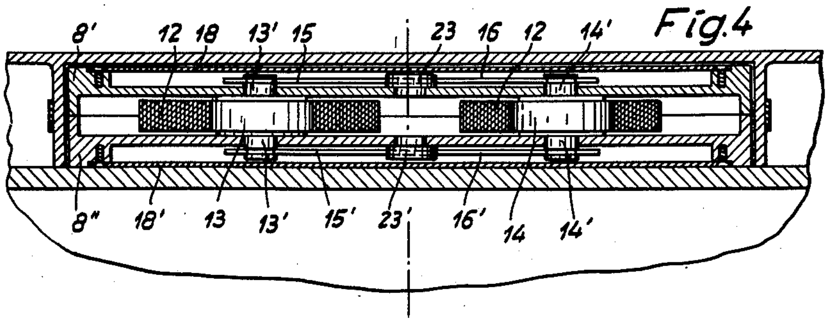
Fig.4

United States Patent Office 2,804,508
Patented Aug. 27, 1957

2,804,508

TAPE REPRODUCER

Richard Mästling and Hans Schimmelbusch, Ulm (Danube), Germany, assignors to Ernst Mästling, Ulm (Danube), Germany, a firm Application July 26, 1955, Serial No. 524,454
Claims priority, application Germany July 31, 1954
8 Claims. (Cl. 179—100.2)

This invention relates to reproducers for signal information recorded on tape, of the type comprising a transducer responsive to said recorded signal information, tape driving means including a drive roll, and a tape magazine case containing two spools and a tape having signal information recorded thereon and carried by both of said spools.

It is an object of the invention to provide a reproducer of the type described and a tape magazine case for use therein, which distinguished by facilitating the reproduction of the signal information recorded on the tape and by low cost owing to simplicity of construction.

It is another object of the invention to provide a reproducer of the type described and a tape magazine case for use therein, which are particularly suitable for carrying into effect the idea of the "talking book" or "talking newspaper," according to which the contents of an educational or fictional book, or of a newspaper, another periodical or the like are read on a magnetic sound carrier, which can be lent or sold thereafter to a large number of interested persons.

According to the invention the magazine case has one or several apertures exposing a length portion of said tape and is removably located in said reproducer relative to said transducer and drive roll to render said transducer responsive to the signal information on said length portion of said tape and to cause said drive roll to engage said length portion of said tape to move the tape past said transducer.

Preferably said aperture or apertures expose said tape for a length portion which is partly wound on both of said spools and extends from one of said spools to the other and said drive roll engages said length portion of said tape where it is wound on one of said spools to pull the tape from the other of said spools, move it past said transducer and wind it on said one spool.

For use with a tape having signal information recorded thereon on two parallel tracks, said case may be symmetrically shaped to enable the case to be located relative to said transducer and drive roll in two mutually reverse positions, in which said transducer is responsive to the signal information on either of said tracks, respectively.

The two spools may be bodily movable and spring means may be provided to urge said spools towards a wall of said magazine case formed with said aperture or apertures. Each of said spools may be rotatably carried by one of two arms pivotally mounted in said magazine case on a common axis, which may lie in a center plane with respect to which said magazine case is symmetrically shaped.

Figure 1:
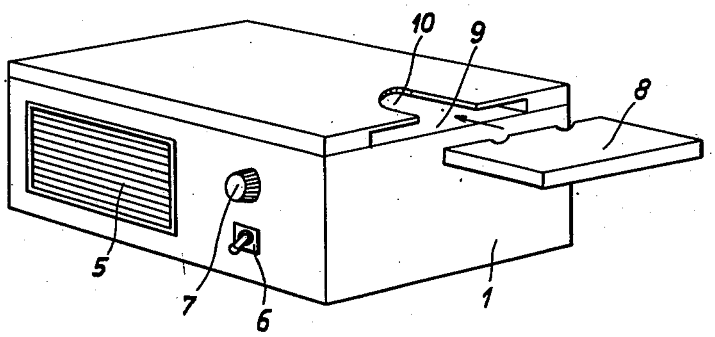
Figure 2:
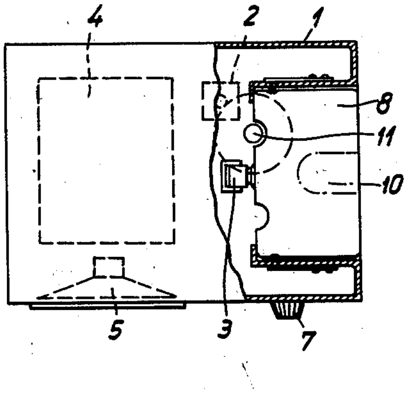
Figure 6:
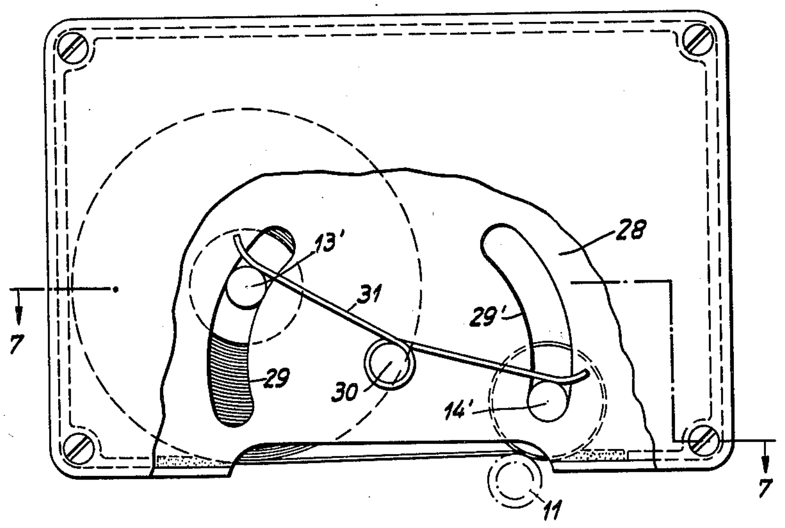
Figure 7:
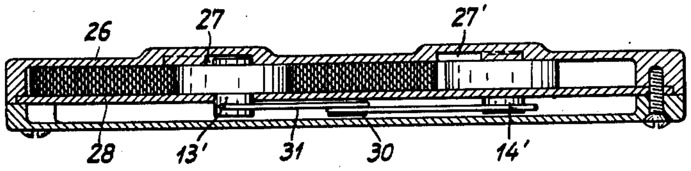
Figure 8:
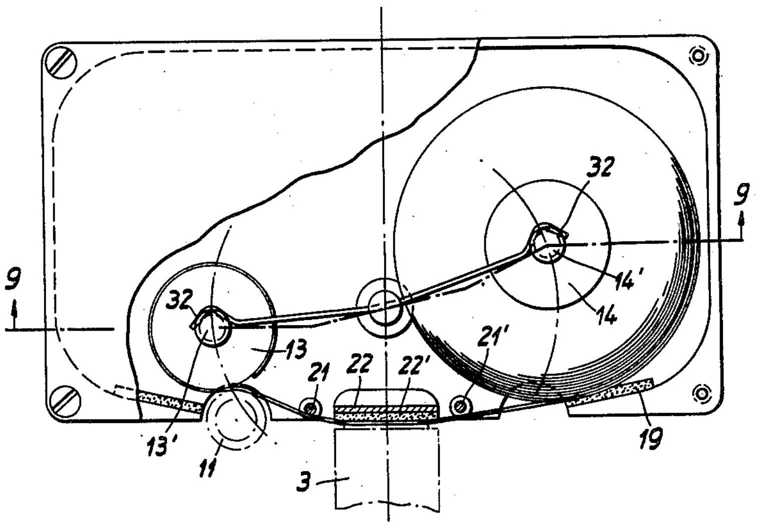
Figure 9:
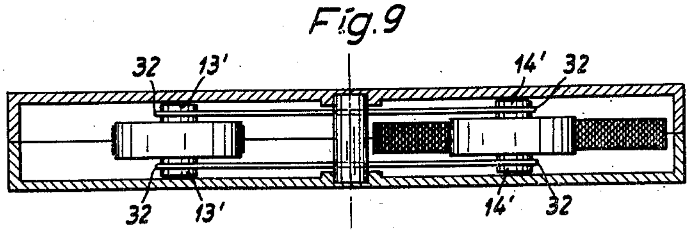

Other features and advantages of the invention will be apparent from the following description of several illustrative embodiments shown in the accompanying drawings, in which Fig. 1 is a perspective view of a reproducer having a slot for receiving the tape magazine case, Fig. 2 is a top plan view of the device of Fig. 1 with the top partly broken away to show the position of the magazine case in the slot, Fig. 3 shows one form of a magazine case inserted in the receiving slot of the reproducer, part of the magazine case wall being broken away to show the spools which are contained in the magazine case and serve for winding and unwinding the sound tape, Fig. 4 is a sectional view taken on line 4—4 of Fig. 3, Fig. 5 is a side view of the magazine case showing the sound tape exposed by the aperture of the case, Fig. 6 shows another form of the magazine case, Fig. 7 is a sectional view taken on line 7—7 of Fig. 6, Fig. 8 shows a still further embodiment of the magazine case, and Fig. 9 is a sectional view taken on line 9—9 of Fig. 8.

In Figs. 1 and 2, 1 designates the casing of the reproducer, which incorporates in a manner known per se an electric drive motor 2 and a magnetic transducer or reproducing head 3 coupled through the amplifier 4 to the loudspeaker 5. The reproducer comprises also in the manner known a switch 6 and a volume control 7.

The magnetic sound tape to be reproduced is representative of a tape having signal information recorded thereon to which the transducer 3 is responsive. The tape is accommodated in a tape magazine case 8, which can be pushed into a corresponding receiving slot 9 of the reproducer casing 1. The casing 1 may be formed with a cut-out portion 10 to facilitate the removal of the magazine case. As will be described with more detail hereinafter, the narrow side wall of the magazine case is formed with an aperture, which exposes a length portion of the sound tape to render the transducer 3 responsive to the signal information on said length portion and to cause the drive roll 11, driven by the motor 2, to engage said length portion of the tape and move the tape past the transducer 3.

Fig. 3 shows an embodiment of a magazine case inserted in the receiving slot of the reproducer. As is apparent from Figs. 4 and 5 the magazine case comprises two symmetrical parts 8′ and 8″, in which the spools 13 and 14 for winding and unwinding the sound tape 12 are rotatably mounted. To this end each of the two spools is carried on a shaft 13′ or 14′, which is guided in slots 13″ or 14″ formed in the walls of the magazine case. Each of the spool shafts is urged towards the narrow side wall 17 of the magazine case by a pre-stressed spring wire 15, 15′ or 16, 16′. That narrow side wall of the magazine case is formed with apertures 17′ and 17″, which expose the sound tape in a length portion which is partly wound on both of said spools and extends from one of said spools to the other. The springs 15, 15′, 16, 16′ and the shafts 13′ and 14′ are covered towards the outside at both ends by covers 18, 18′ screwed to the magazine case.

The showing of Fig. 3 is based on the assumption that the sound tape is to be pulled from the spool 14 past the transducer 3 and wound on the spool 13. For this reason the magazine case is located in the reproducer so that the drive roll 11 engages the sound tape where it is wound on the spool 13. In this way the spool 13 is urged from the wall 17 of the magazine case and driven by the roll 11 owing to the frictional engagement between the roll 11 and the tape on the spool. At the same time the spool 14 is urged by the springs 16, 16′ against the inside wall of the magazine case so that the spool 14 is slightly braked. To avoid damage to the sound tape the inside wall of the magazine case may be provided with a felt facing 19.

The sound tape is engaged and guided between the spools 13 and 14 by guide pins 20, 20′, 21, 21′ provided on both sides of the tape past the transducer 3, which is constructed in a manner known per se and requires no further explanation. The transducer is movably carried in a holder 3' firmly incorporated in the reproducer and is urged by a spring 3'' against the sound tape, which engages and is guided by a counterplate 22. The counterplate 22 is arranged intermediate the spools 13 and 14 and may be provided with a felt facing 22' where it is engageable by the sound tape.

Fig. 5 shows the arrangement with tape having signal information recorded on two parallel tracks. The reproducer case defines a chamber which has symmetry with respect to the center plane M—M and which contains the transducer 3, drive roll 11, and magazine case 8. The hatched pole face of the transducer 3 registers with the upper sound track of the tape. The magazine case is symmetrical with respect to the center plane M—M extending through the transducer 3 and the drive roll 11 is arranged in such a manner that the lower sound track can be reproduced after the upper one if the magazine case is pulled out of the reproducer, turned through 180 deg. and reinserted. Now the sound tape will be wound back from the full spool to the empty one and the formerly lower sound track will be moved past the transducer.

The compression springs 15, 16 and 15', 16' may be formed of two spring wires, which are inserted in transverse bores of the pins 23 or 23' fixed to the respective walls of the magazine case.

Leaf springs 24, 24' are arranged in the slot of the reproducer casing to enter corresponding recesses 25, 25' of the magazine case. These springs 24, 24' and recesses 25, 25' form interengaging means, which cooperate to releasably or removably lock or locate said magazine case in said slot in such a position relative to the transducer 3 and drive roll 11 that the transducer is responsive to the signal information on the exposed length portion of the tape and the drive roll engages said exposed length portion of the tape to move the tape past said transducer.

In the embodiment of the magazine case shown in Figs. 6 and 7 the spool shafts 13' and 14' are guided in arcuate guide openings. To this end a wall 26 of the magazine case is formed with two arcuate grooves 27, 27' and a partition 28 is formed with two arcuate slots 29, 29'. Each of the guide openings 27, 27', 29, 29' is formed according to an arc of a circle common to the guide openings of each of the parallel walls 26, 28. The spool shafts 13' and 14' extend through the partition 28 and are both engaged by a compression spring, which is represented here by a spring wire 31 embracing the central pin 30, which is disposed at the center of the circle defined by the guide openings 27, 27', 29, 29'. The illustrated shape of the spring wire 31 has the special advantage of maintaining a substantially constant spring force while one spool is moving upwardly and the other is moving downwardly (when viewed as in Fig. 6) during the winding operation.

In the embodiment shown in Figs. 8 and 9 the shafts 13' and 14' of the two spools move also along arcuate paths during the movement of the sound tape. In this case, however, the spool shafts are not guided in arcuate slots or grooves but only by the engagement of the hooked ends 32 of the compression springs, consisting of spring wire, with corresponding grooves in the spool shafts 13' and 14'. A lateral guidance of the spool shafts 13' and 14' is provided by the inside walls of the magazine case.

The reproducer may be provided with a rewinding device to enable the sound tape to be rewound entirely or for part of its length for a repeated reproduction. The reproducer may also be provided with a contact which is automatically opened after the sound tape has been wound from the supply spool and which is effective to cut out the motor. Such means are known per se in sound tape handling devices and do not require further explanation.

It is obvious that the invention is directed not only to the reproducer as a whole but also to the tape magazine case alone. Whereas the examples shown are concerned with magnetic tape on which sound information is recorded in the form of magnetic variations, applications of the invention to the reproduction of tape-recorded signal information other than sound and to the use of other than magetic tape will be apparent to persons skilled in the tape recording art.

We claim:

1. A reproducer for signal information recorded on tape, comprising a transducer responsive to said recorded signal information, tape driving means including a drive roll, a tape magazine case containing two bodily movable spools and a tape having signal information recorded thereon and carried by both of said spools, said magazine case having a wall formed with at least one aperture exposing a length portion of said tape, spring means arranged to urge said spools towards said wall, and means removably locating said magazine case relative to said transducer and drive roll to render said transducer responsive to signal information on said length portion of said tape and to cause said drive roll to engage said length portion of said tape to move the tape past said transducer.

2. A reproducer for signal information recorded on tape, comprising a transducer responsive to said recorded signal information, tape driving means including a drive roll, a tape magazine case, two arms pivotally mounted in said magazine case on a common axis, two spools each of which is rotatably carried on one of said arms and which are contained in said magazine case, a tape having signal information recorded thereon and carried by both of said spools, said magazine case having at least one aperture exposing a length portion of said tape, and means removably locating said magazine case relative to said transducer and drive roll to render said transducer responsive to signal information on said length portion of said tape and to cause said drive roll to engage said length portion of said tape to move the tape past said transducer.

3. A reproducer for signal information recorded on tape, comprising a transducer responsive to said recorded signal information, tape driving means including a drive roll, a tape magazine case which is symmetrically shaped with respect to a center plane, two arms pivotally mounted in said magazine case on a common axis lying in said center plane, two spools each of which is rotatably carried on one of said arms and which are contained in said magazine case, a tape having signal information recorded thereon and carried by both of said spools, said magazine case having at least one aperture exposing a length portion of said tape, and means removably locating said magazine case relative to said transducer and drive roll to render said transducer responsive to signal information on said length portion of said tape and to cause said drive roll to engage said length portion of said tape to move the tape past said transducer.

4. A reproducer for signal information recorded on tape, comprising a transducer responsive to said recorded signal information, tape driving means including a drive roll, a tape magazine case containing two bodily movable spools and a tape having signal information recorded thereon and carried by both of said spools, said magazine case having a wall formed with at least one aperture exposing said tape in a length portion which is partly wound on both of said spools and extends from one of said spools to the other, spring means arranged to urge said spools towards said wall, and means removably locating said magazine case relative to said transducer and drive roll to render said transducer responsive to signal information on said length portion of said tape and to cause said drive roll to engage by friction said tape wound on one of said spools thereby urging said one spool away from said wall and driving the same in a direction to pull the tape from the other of said spools, to move it past said transducer, and to wind it further on said one spool.

5. A tape magazine case comprising two parallel walls each of which is formed with two guide openings parallel to those in the other of said parallel walls, a wall extending transversely to said parallel walls and formed with at least one exposing aperture, two shafts extending between said parallel walls and guided in said guide openings, two spools contained in said case and carried each by one of said shafts, and a tape having signal information recorded thereon and carried by both of said spools, said exposing aperture exposing a length portion of said tape.

6. A tape magazine case comprising two parallel walls each of which is formed with two guide openings each of which is formed like an arc of a circle, the guide openings of each wall being parallel to those of the other of said parallel walls, a wall extending transversely to said parallel walls and formed with at least one exposing aperture, two shafts extending between said parallel walls and guided in said guide openings, two spools contained in said case and carried each by one of said shafts, and a tape having signal information recorded thereon and carried by both of said spools, said exposing aperture exposing a length portion of said tape.

7. A tape magazine case comprising two parallel walls each of which is formed with two guide openings each of which is formed like an arc of a circle common to the guide openings of each of said walls, the guide openings of each wall being parallel to those of the other of said parallel walls, a wall extending transversely to said parallel walls and formed with at least one exposing aperture, two shafts extending between said parallel walls and guided in said guide openings, two spools contained in said case and carried each by one of said shafts, a tape having signal information recorded thereon and carried by both of said spools, said exposing aperture exposing a length portion of said tape, a pin disposed in said case at the center of said circle, and a spring carried by said pin and having two legs each of which engages one of said shafts with pressure.

8. A tape magazine case comprising two arms pivotally mounted in said case on a common axis and formed with hooked outer ends, two shafts each of which is embraced by one of said hooked ends, two spools contained in said case and rotatably carried each by one of said shafts, and a tape having signal information recorded thereon and carried by both of said spools, said magazine case having at least one aperture exposing a length portion of said tape.

References Cited in the file of this patent

UNITED STATES PATENTS

| | | |
|---|---|---|
| 1,665,784 | Hornauer | Apr. 10, 1928 |
| 2,609,457 | Thurm | Sept. 2, 1952 |